United States Patent
Reed et al.

(10) Patent No.: US 8,157,037 B2
(45) Date of Patent: Apr. 17, 2012

(54) MOTOR SENSOR ASSEMBLY FOR ALTERNATIVE FUEL VEHICLES

(75) Inventors: William S. Reed, Greenfield, IN (US); Dan H. Nguy, Royal Oak, MI (US); Christopher J. Bowes, Indianapolis, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 475 days.

(21) Appl. No.: 12/415,540

(22) Filed: Mar. 31, 2009

(65) Prior Publication Data

US 2009/0250273 A1    Oct. 8, 2009

Related U.S. Application Data

(60) Provisional application No. 61/042,620, filed on Apr. 4, 2008.

(51) Int. Cl.
*B60K 1/00*    (2006.01)

(52) U.S. Cl. ............... 180/65.6; 180/65.1; 180/65.265; 475/3; 475/5

(58) Field of Classification Search .......... 475/3, 5, 475/159; 180/165, 65.1, 65.265, 65.6
See application file for complete search history.

(56) References Cited

U.S. PATENT DOCUMENTS

| | | | |
|---|---|---|---|
| 4,186,609 A * | 2/1980 | Baermann | 73/497 |
| 5,157,966 A * | 10/1992 | Lugosi et al. | 73/115.02 |
| 6,005,358 A * | 12/1999 | Radev | 318/139 |
| 6,308,794 B1 * | 10/2001 | Oppitz | 180/65.25 |
| 6,340,339 B1 * | 1/2002 | Tabata et al. | 475/5 |
| 6,522,133 B1 * | 2/2003 | Haupt et al. | 324/207.22 |
| 6,663,279 B1 * | 12/2003 | Heinzelmann et al. | 374/144 |
| 7,218,098 B2 * | 5/2007 | McCarrick et al. | 324/173 |
| 7,284,313 B2 * | 10/2007 | Raszkowski et al. | 29/596 |
| 7,285,074 B2 * | 10/2007 | Gartner et al. | 477/195 |
| 7,285,949 B2 * | 10/2007 | Burns et al. | 324/173 |
| 7,372,223 B2 | 5/2008 | Yamaguchi et al. | |
| 7,614,466 B2 * | 11/2009 | Kano et al. | 180/65.22 |
| 2005/0054473 A1 | 3/2005 | Burns | |
| 2007/0152656 A1 * | 7/2007 | McCarrick et al. | 324/173 |

FOREIGN PATENT DOCUMENTS

| | | |
|---|---|---|
| DE | 10 2004 039 046 A1 | 3/2005 |
| DE | 10 2004 043 710 A1 | 4/2005 |
| DE | 10 2006 018 818 A1 | 10/2007 |
| WO | 2007/122065 A1 | 11/2007 |

OTHER PUBLICATIONS

German Office Action for German Application No. 10 2009 016 276.3-52 mailed Jan. 27, 2011.

* cited by examiner

*Primary Examiner* — J. Allen Shriver, II
*Assistant Examiner* — James Triggs
(74) *Attorney, Agent, or Firm* — Ingrassia Fisher & Lorenz, P.C.

(57) ABSTRACT

An automotive drive system includes a transmission comprising a plurality of gears, an electric motor having a rotor and being coupled to the transmission such that operation of the electric motor causes actuation of the gears, and a sensor assembly coupled to and located on the exterior of at least one of the transmission and the electric motor, the sensor assembly being configured to detect movement of at least one of the rotor and the plurality of gears and generate a signal representative thereof.

20 Claims, 7 Drawing Sheets

MOTOR SENSOR ASSEMBLY FOR ALTERNATIVE FUEL VEHICLES

CROSS-REFERENCE TO RELATED APPLICATIONS

This application claims the benefit of U.S. Provisional Application No. 61/042,620, filed Apr. 4, 2008.

TECHNICAL FIELD

The present invention generally relates to alternative fuel vehicles, and more particularly relates to a motor sensor assembly for alternative fuel vehicles.

BACKGROUND OF THE INVENTION

In recent years, advances in technology, as well as ever-evolving tastes in style, have led to substantial changes in the design of automobiles. One of the changes involves the complexity of the electrical and drive systems within automobiles, particularly alternative fuel vehicles, such as hybrid, electric, and fuel cell vehicles. Such alternative fuel vehicles typically use one or more electric motors, perhaps in combination with another actuator, to drive the wheels.

Traditional motor control systems normally include a feedback device or position sensor to provide speed, position, and direction information about the motor. Conventionally, such sensors are included as a component within the motor assembly, which increases the complexity and cost of the motor. Additionally, because of the integration of the motor with the transmission, a substantial portion of the transmission may have to be removed from the vehicle for the sensor to be accessible by a technician (e.g., for repair or servicing).

Moreover, as the power and performance demands on alternative fuel vehicles continue to increase, there is an ever increasing need to maximize the efficiency of the various systems within the vehicles, as well as reduce the overall costs of the vehicles. Moreover, there is a constant desire to reduce the space required by the components in order to minimize the overall cost and weight of the vehicles.

Accordingly, it is desirable to provide an improved motor sensor assembly for alternative fuel vehicles. Furthermore, other desirable features and characteristics of the present invention will become apparent from the subsequent detailed description and the appended claims, taken in conjunction with the accompanying drawings and the foregoing technical field and background.

SUMMARY OF THE INVENTION

An automotive drive system is provided. The automotive drive system includes a transmission comprising a plurality of gears, an electric motor having a rotor and being coupled to the transmission such that operation of the electric motor causes actuation of the gears, and a sensor assembly coupled to and located on the exterior of at least one of the transmission and the electric motor, the sensor assembly being configured to detect movement of at least one of rotor and the plurality of gears and generate a signal representative thereof.

An automotive assembly is provided. The automotive assembly includes a frame, a transmission coupled to the frame and comprising a plurality of gears, an electric motor having a rotor and being coupled to the transmission such that operation of the electric motor causes actuation of the gears, and a sensor assembly coupled to and located on the exterior of at least one of the transmission and the electric motor, the sensor assembly being configured to detect movement of at least one of the rotor and the plurality of gears and generate a signal representative thereof, wherein the frame, the transmission, the electric motor, and the sensor assembly are configured such that the sensor assembly may be manually accessed by a user without removing the transmission or the electric motor from the frame.

An automotive assembly is provided. The automotive assembly includes a frame, a transmission coupled to the frame and comprising a plurality of gears, an electric motor having a rotor and being coupled to the transmission such that operation of the electric motor causes actuation of the gears, a sensor assembly coupled to and located on the exterior of at least one of the transmission and the electric motor, the sensor assembly being configured to detect movement of at least one of the rotor and the plurality of gears and generate a signal representative thereof, and a lubricating fluid reservoir coupled to the frame coupled to the frame and being adjacent to the transmission and the electric motor, and wherein the lubricating fluid reservoir, the transmission, the electric motor, and the sensor assembly are arranged such that the sensor assembly is manually accessible when the lubricating fluid reservoir is removed.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-7 are merely illustrative and may not be drawn to scale.

According to one aspect of the present invention, an automotive sensor assembly is provided in which a motor speed sensor is mounted external to a motor assembly and is serviceable without removing the transmission from the vehicle. The sensor may be located so as to not add to the length (i.e., axial dimension) of the transmission.

In one embodiment, the motor speed sensor is mounted to a clutch housing and is mounted to provide access through the oil pan, both for servicing and for electrical connection. In one embodiment, the motor speed sensor is a rigid component integral the sensor, as opposed to a loose bundle of wires.

Figure 1:
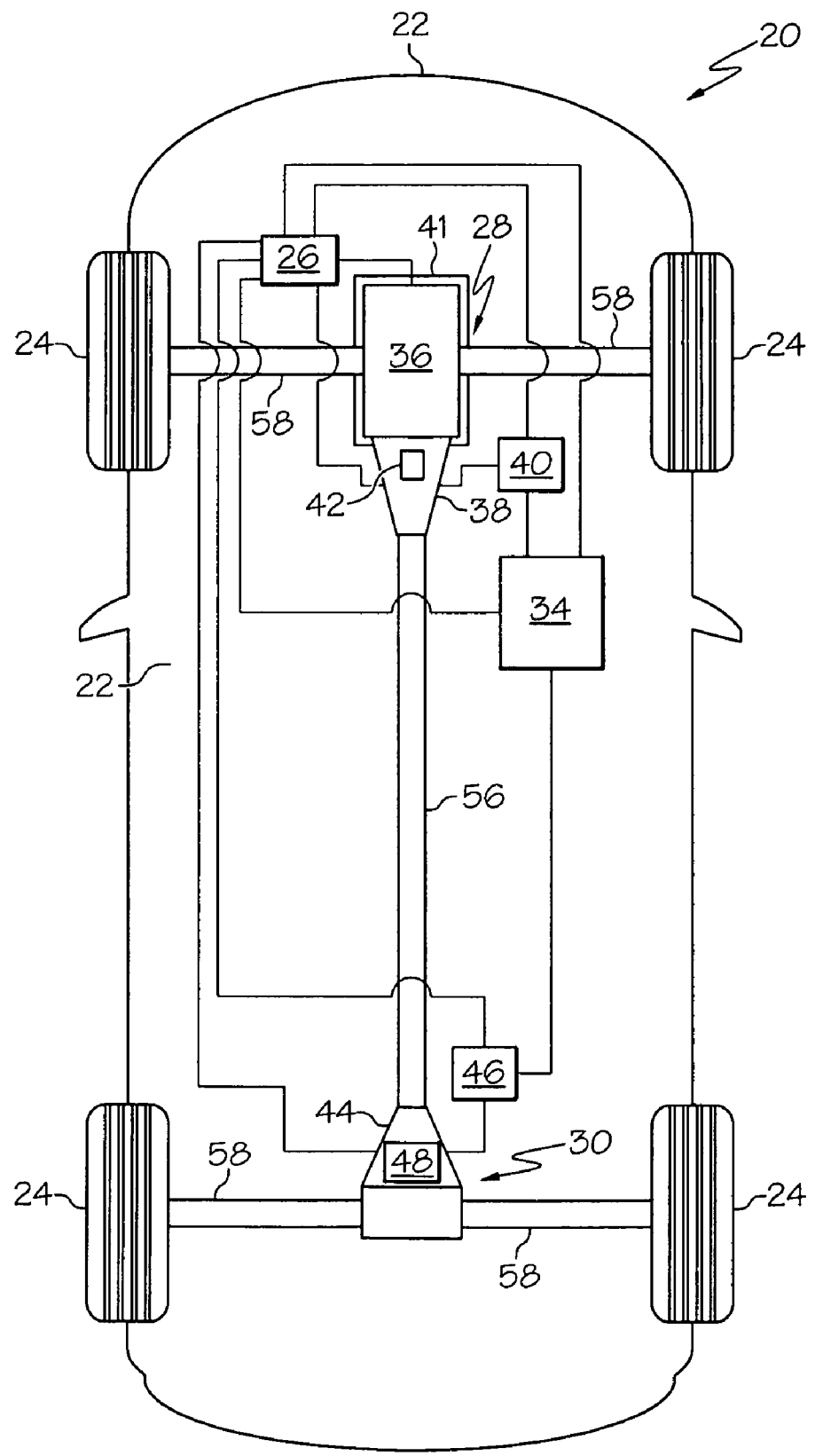
FIG. 1 is a schematic view of an exemplary automobile according to one embodiment of the present invention.

FIG. 1 illustrates an electric vehicle (or automobile) 20, according to one embodiment of the present invention. The automobile 20 includes a frame 22, four wheels 24, and an electronic control system 26. Although not specifically shown, the frame includes a chassis and a body arranged on the chassis that substantially encloses the other components of the vehicle 20. The wheels 24 are each rotationally coupled to the frame 22 near a respective corner thereof.

The automobile 20 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 20 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the exemplary embodiment illustrated in FIG. 1, the automobile 20 is an AWD hybrid vehicle, and further includes a forward actuator assembly 28, a rear actuator assembly 30, and a battery (i.e., direct current (DC) power supply) 34. The forward actuator assembly 28 includes an internal combustion engine 36, a forward motor/transmission assembly 38, a forward power inverter assembly 40 (or Traction Power Inverter Module (TPIM)), and a lubricating fluid reservoir 41.

The forward motor/transmission assembly 38 includes a transmission therein that is integrated with one or more motor/generators (or "motors") 42, as is commonly understood, and is coupled to the combustion engine 36. The motor 42 includes a stator assembly and a rotor assembly, as described in greater detail below. The lubricating fluid reservoir 41 may be an oil pan and/or a transmission sump located beneath the forward motor/transmission assembly 38 that is configured to collect, for example, cooling and/or lubricating liquid such as oil. The rear actuator assembly 30 includes a rear motor/transmission assembly 44 and a rear power inverter 46 (or Rear Power Inverter Module (RPIM)).

With continued reference to FIG. 1, the rear actuator assembly 30 is coupled to the forward actuator assembly 28 through a main (or drive) shaft 56, and each of the actuator assemblies 28 and 30 are coupled to the wheels 24 through multiple axles 58.

Although not shown, the forward and rear inverters 40 and 46 each include, in one embodiment, a three-phase circuit coupled to a voltage source and a motor. More specifically, the inverters 40 and 46 each include a switch network having a first input coupled to the battery 34 and an output coupled to the motor/generator(s) 42 and 48. Although a single voltage source (e.g., the battery 34) is shown, a distributed direct current (DC) link with two series sources may be used.

The switch networks may include three pairs of series switches with antiparallel diodes (i.e., antiparallel to each switch) corresponding to each of the phases of the operation of the motors 42 and 48.

Still referring to FIG. 1, the electronic control system 26 is in operable communication with the forward actuator assembly 28, the rear actuator assembly 30, the battery 34, and the inverters 40 and 46. Although not shown in detail, the electronic control system 26 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below.

In one embodiment, the automobile 20 is a "series HEV," in which the combustion engine 36 is not directly coupled to the transmission(s), but coupled to the motors 42 and 48 and is used to actuate the motors 42 and 48 to generate electric power. In another embodiment, the automobile 20 is a "parallel HEV," in which the combustion engine 30 is directly coupled to the transmission(s) by, for example, having the rotor of the electric motor(s) rotationally coupled to the drive shaft of the combustion engine 36.

During operation, still referring to FIG. 1, the automobile 20 is operated by providing power to the wheels 24 with the combustion engine 36 and the electric motors 42 and 48 in an alternating manner and/or with the combustion engine 36 and the electric motors 42 and 48 simultaneously. In order to power the electric motors 42 and 48, DC power is provided from the battery 34 to the inverters 40 and 46, which convert the DC power to AC power, prior to energizing the electric motors 42 and 48.

Figure 2:
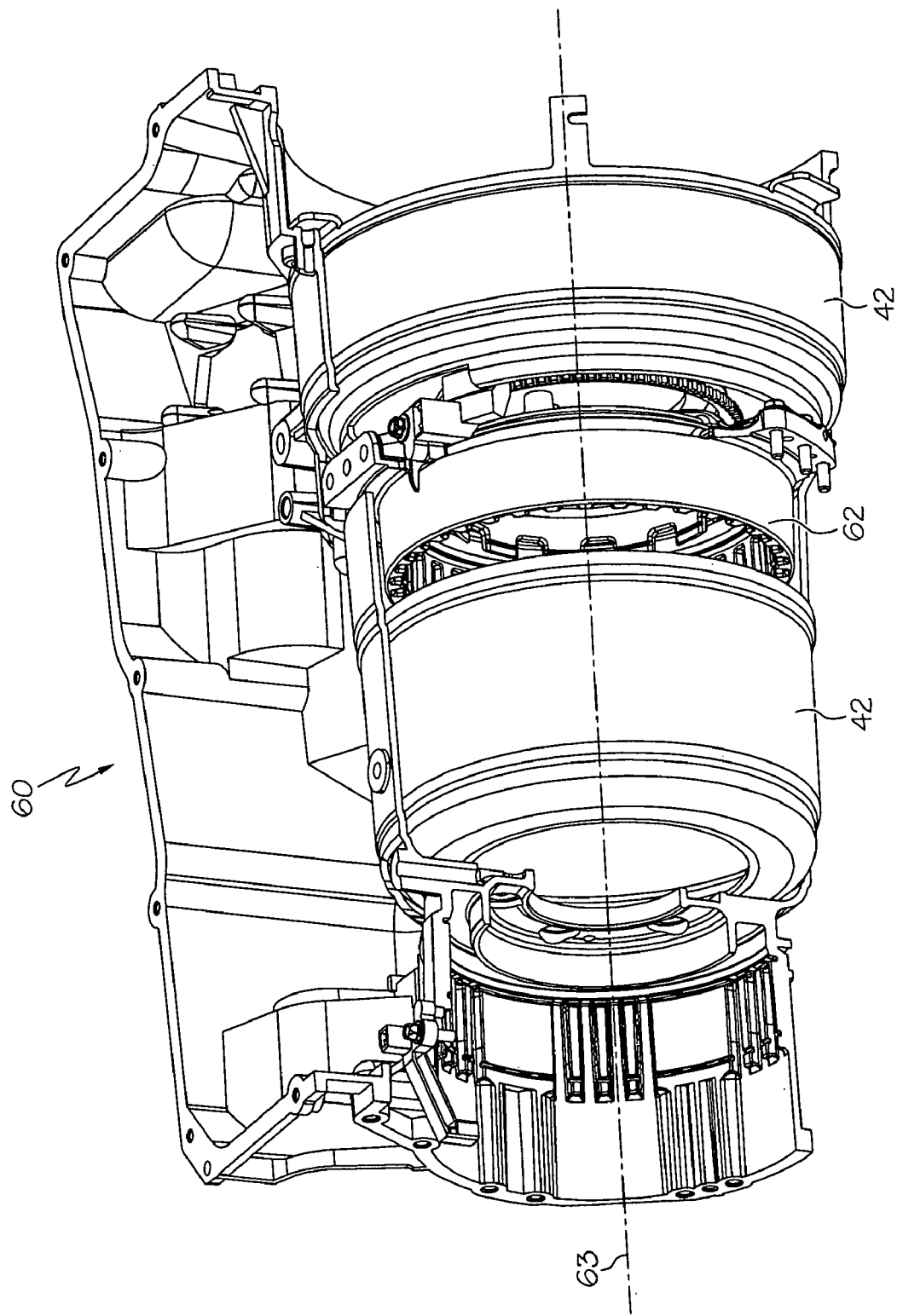
FIG. 2 is a partial cross-sectional, isometric view of a transmission case including two motors and a clutch housing.
Figure 3:
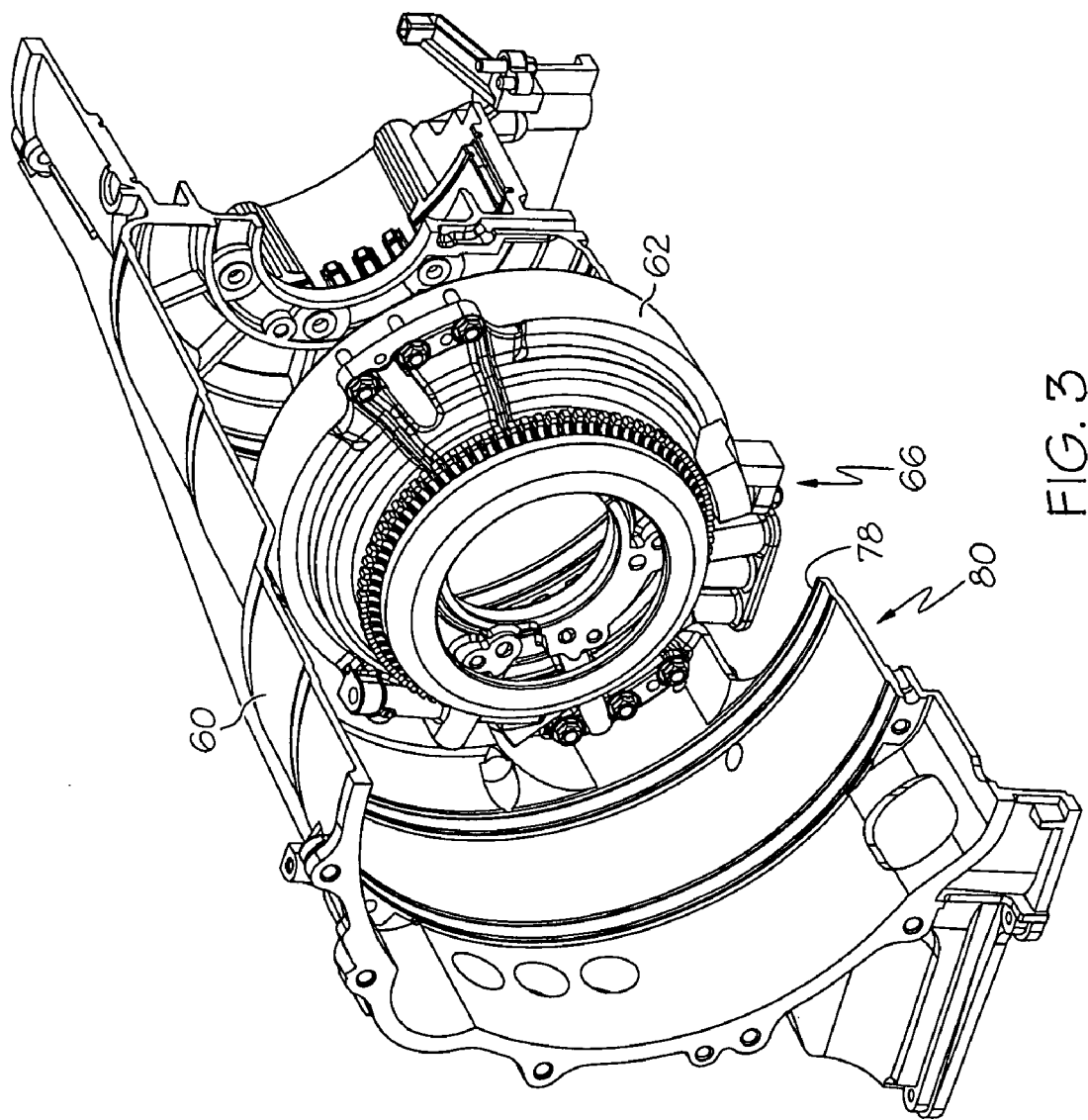
FIG. 3 is a partial cross-sectional, isometric view of the transmission case of FIG. 2 with the two motors removed therefrom.
Figure 4:
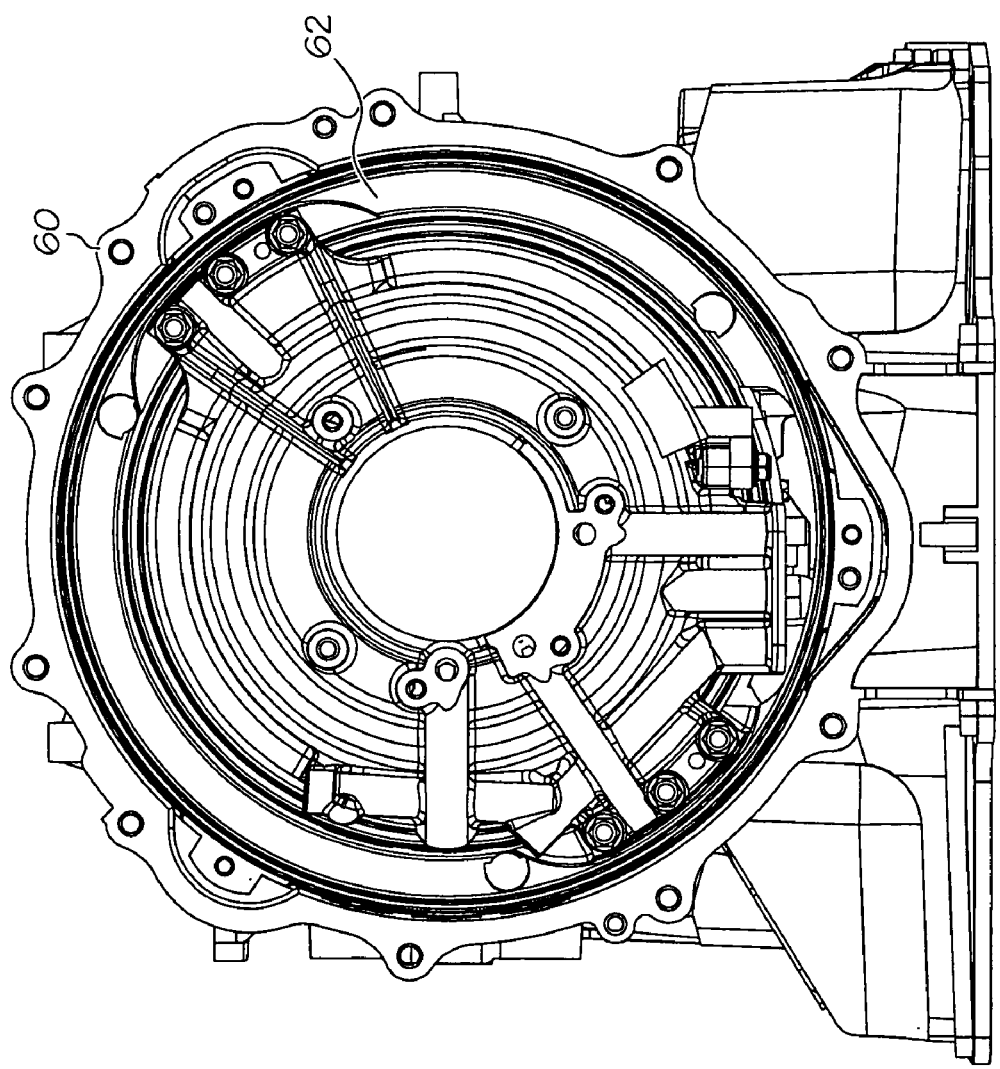
FIG. 4 is an axial view of the transmission case of FIG. 3.

FIGS. 2, 3, and 4 illustrate a transmission case 60, which may be implemented within the automobile 20 (FIG. 1) at, for example, the forward actuator assembly 28, according to one embodiment of the present invention. Amongst other components, the transmission case 60 includes (or has installed therein) two motors 42 and a clutch housing 62 located between the motors 42. The motors 42 are arranged about an axis 63 in a substantially symmetric fashion. That is, the motors 42 are arranged such that the rotors therein rotate about the axis 63.

Figure 5:
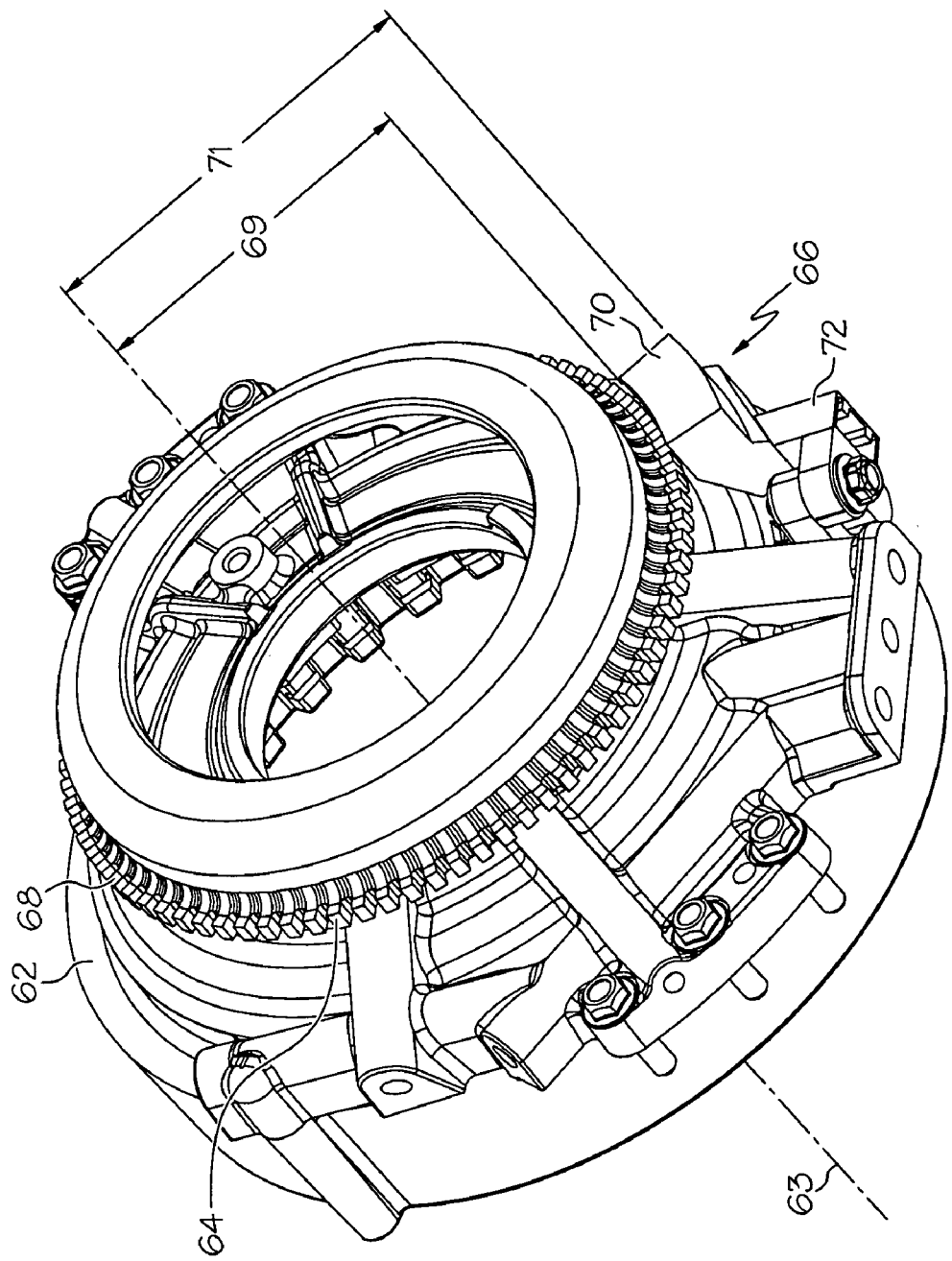
FIGS. 5 and 6 are isometric views of the clutch housing of FIG. 2.
Figure 6:
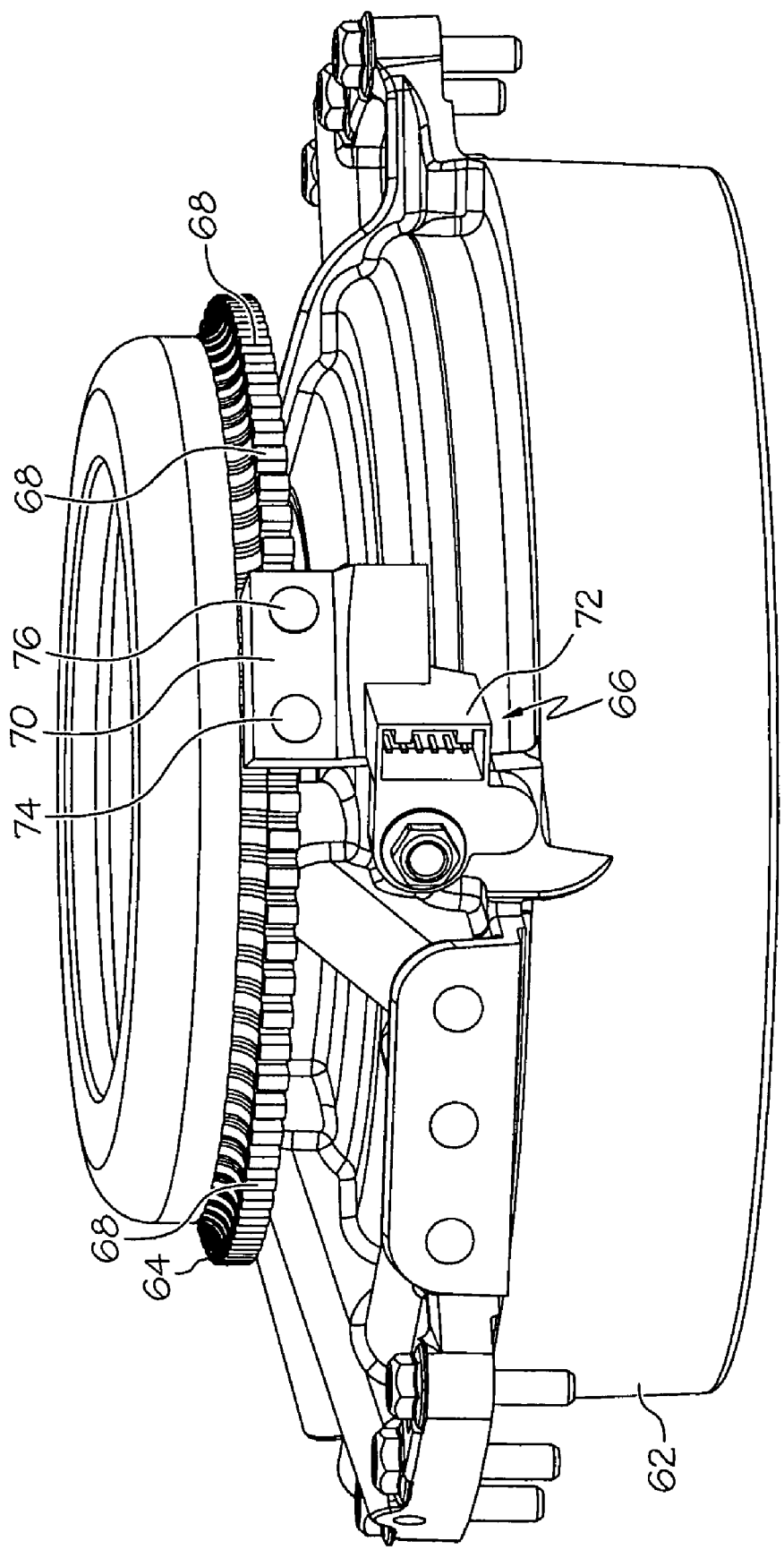

FIGS. 5 and 6 illustrate the clutch housing 62 in greater detail. Amongst other components (e.g., a plurality of gears), and of particular interest, the clutch housing 62 includes a motor speed sensor assembly (or motor sensor) 66 which extends to a tone wheel (or a motor movement indicator member) 64. Although not clearly shown, it should be understood that the tone wheel 64 is, at least in one embodiment, a component of one of the motors 42. The tone wheel 64 includes a plurality of magnetic teeth 68 around a periphery thereof and has a substantially annular shape with a radius 69. The sensor 66 includes a sensor body 70 and a connector piece (or plug) 72. In one embodiment, the sensor body 70 includes first and second magnetic field (and/or flux) sensors 74 and 76 that are aligned with the magnetic teeth 68 of the tone wheel 64. The magnetic field sensors 74 and 76 may be Hall Effect sensors that detect movement of the magnetic fields generated by the magnetic teeth 68 on the tone wheel 64 to detect movement of the tone wheel 64, as well as any components rotationally coupled thereto, such as the clutch and/or the rotor of one of the motors 42. As will be appreciated by one skilled in the art, the magnetic field sensors 74 and 76 also generate signals representative of the position and movement of the tone wheel 64, which may be used to control the motors 42.

The sensor assembly 66 is connected to an exterior of the clutch housing 62 (and/or the transmission case 60 and/or the motors 42) and located a distance 71 from the axis 63, adjacent to the tone wheel 68. In one embodiment, the radius 69 of the tone wheel 68 is less than or equal to (i.e., not greater than) the distance 71. Although not shown in detail, the connector piece 72 is made of a rigid, insulating material (e.g., a composite material) and includes various conductors therein that are electrically connected to the magnetic field sensors 74 and 76.

Figure 7:
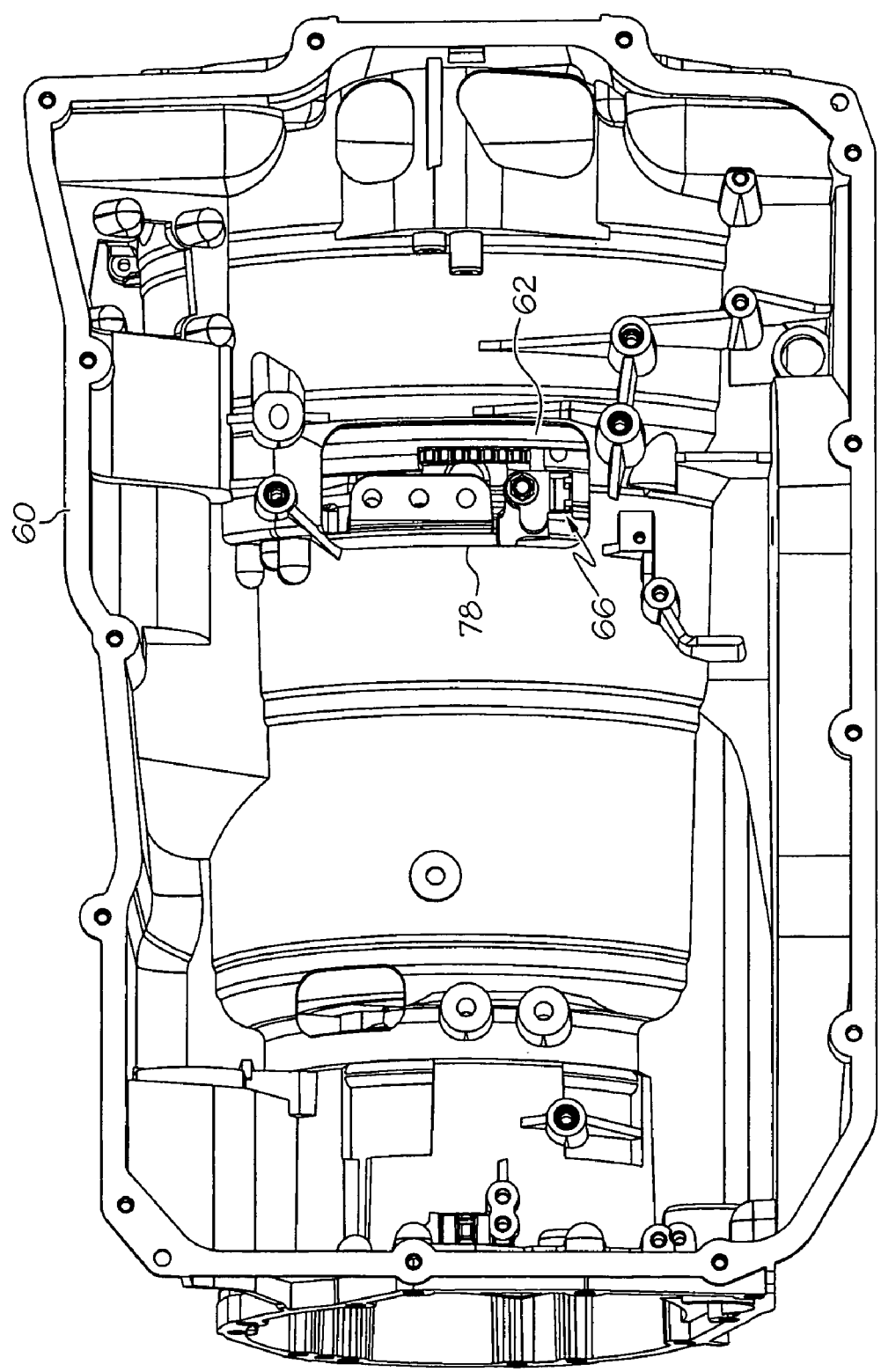
FIG. 7 is a bottom plan view of the transmission case of FIG. 2.

Referring to FIGS. 3 and 7, in one embodiment, the clutch housing 62 is installed in the transmission case 60 in an orientation such that the sensor 66 is located near a lower side 80 of the transmission case 60 (i.e., as the transmission case 60 is installed into the automobile 20). In the depicted embodiment, the transmission case 60 also includes a sensor access opening 78 on the lower side 80 and adjacent to the sensor 66, through which the sensor 66 (particularly the connector piece 72) is accessible.

Referring to FIGS. 1 and 3, the transmission case 60 is, in one embodiment, installed in the automobile 20 such that the lower side 80 of the transmission case 60 is adjacent to and manually accessible through the lubricating fluid reservoir 41. In particular, the installation of the transmission case 60 allows the sensor access opening 78, as well as the sensor 66, to be accessible when the lubricating fluid reservoir 41 is removed from the automobile, such as during maintenance.

One advantage of the sensor assembly described above is that the sensor is not integrated within a motor, which simplifies and reduces the manufacturing costs of the motors. Another advantage is that the sensor may be accessed without removing the transmission. As a result, servicing the sensor and making an electrical connection to the sensor is facilitated. A further advantage is that because the connector piece is integral with the sensor and made from a rigid material, the likelihood of it being damaged during installation of the clutch housing is reduced. A yet further advantage is that because of the location of sensor (i.e., at an edge of the tone wheel), the axial length of the clutch housing (and/or the transmission as a whole) is not increased, thereby saving space.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An automotive drive system comprising:
   a transmission comprising a plurality of gears;
   an electric motor having a rotor and being coupled to the transmission such that operation of the electric motor causes actuation of the gears;
   a tone wheel configured to detect movement of the electric motor; and
   a sensor assembly coupled to and located on the exterior of at least one of the transmission and the electric motor, the sensor assembly being further coupled to the tone wheel and configured to detect movement of at least one of the rotor and the plurality of gears by detecting movement of the tone wheel and generate a signal representative thereof.

2. The automotive drive system of claim 1, wherein the rotor is arranged to rotate about an axis and the sensor assembly is located a distance from the axis.

3. The automotive drive system of claim 2, wherein the tone wheel is coupled to at least one of the transmission and the electric motor and configured to rotate about the axis during the operation of the electric motor, the tone wheel having a radius that is not more than the distance between the axis and the sensor assembly.

4. The automotive drive system of claim 3, wherein the tone wheel is adjacent to the sensor assembly.

5. The automotive drive system of claim 4, wherein the tone wheel comprises a plurality of magnetic teeth around a periphery of the tone wheel.

6. The automotive drive system of claim 5, wherein the sensor assembly comprises a plurality of magnetic field sensors aligned with the magnetic teeth of the tone wheel.

7. The automotive drive system of claim 6, further comprising a connector piece coupled to the sensor assembly and configured to mate with a plug, wherein the connector piece is substantially made of a rigid material.

8. An automotive assembly comprising:
   a frame;
   a transmission coupled to the frame and comprising a plurality of gears;
   an electric motor having a rotor and being coupled to the transmission such that operation of the electric motor causes actuation of the gears;
   a tone wheel configured to detect movement of the electric motor; and
   a sensor assembly coupled to and located on the exterior of at least one of the transmission and the electric motor, the sensor assembly being further coupled to the tone wheel and configured to detect movement of at least one of the rotor and the plurality of gears by detecting movement of the tone wheel and generate a signal representative thereof, wherein the frame, the transmission, the electric motor, and the sensor assembly are configured such that the sensor assembly may be manually accessed by a user without removing the transmission or the electric motor from the frame.

9. The automotive assembly of claim 8, wherein the rotor is arranged to rotate about an axis and the sensor assembly is located a distance from the axis.

10. The automotive assembly of claim 9, wherein the tone wheel is coupled to at least one of the transmission and the electric motor and configured to rotate about the axis during the operation of the electric motor, the tone wheel having a radius that is not more than the distance between the axis and the sensor assembly.

11. The automotive assembly of claim 10, wherein the tone wheel is adjacent to the sensor assembly.

12. The automotive assembly of claim 11, wherein the tone wheel has a substantially annular shape and comprises a plurality of magnetic teeth around a periphery of the tone wheel.

13. The automotive assembly of claim 12, wherein the sensor assembly comprises a plurality of magnetic field sensors aligned with the magnetic teeth of the tone wheel.

14. The automotive assembly of claim 13, further comprising a connector piece coupled to the sensor assembly and configured to mate with a plug, wherein the connector piece is substantially made of a rigid material.

15. The automotive assembly of claim 8, further comprising a lubricating fluid reservoir coupled to the frame and being adjacent to the transmission and the electric motor, and wherein the lubricating fluid reservoir, the transmission, the electric motor, and the sensor assembly are arranged such that the sensor assembly is manually accessible through the lubricating fluid reservoir, and wherein the frame includes an opening adjacent to the sensor assembly on a lower portion of the frame adjacent to the fluid reservoir whereby the sensor assembly is manually accessible through the lubricating fluid reservoir via the opening.

16. An automotive assembly comprising:
a frame;
a transmission coupled to the frame and comprising a plurality of gears;
an electric motor having a rotor and being coupled to the transmission such that operation of the electric motor causes actuation of the gears;
a tone wheel configured to detect movement of the electric motor;
a sensor assembly coupled to and located on the exterior of at least one of the transmission and the electric motor, the sensor assembly being further coupled to the tone wheel and configured to detect movement of at least one of the rotor and the plurality of gears by detecting movement of the tone wheel and generate a signal representative thereof; and
a lubricating fluid reservoir coupled to the frame and being adjacent to the transmission and the electric motor, and wherein the lubricating fluid reservoir, the transmission, the electric motor, and the sensor assembly are arranged such that the sensor assembly is manually accessible when the lubricating fluid reservoir is removed from the frame.

17. The automotive assembly of claim 16, wherein the frame, the transmission, the electric motor, and the sensor assembly are configured such that the sensor assembly may be manually accessed by a user without removing the transmission or the electric motor from the frame, and wherein the frame includes an opening adjacent to the sensor assembly on a lower portion of the frame adjacent to the fluid reservoir whereby the sensor assembly is manually accessible through the lubricating fluid reservoir via the opening.

18. The automotive assembly of claim 17, wherein the rotor is arranged to rotate about an axis and the sensor assembly is located a distance from the axis, and wherein the tone wheel is coupled to at least one of the transmission and the electric motor and configured to rotate about the axis during the operation of the electric motor, the tone wheel having a radius that is not more than the distance between the axis and the sensor assembly.

19. The automotive assembly of claim 18, wherein the tone wheel is adjacent to the sensor assembly and comprises a plurality of magnetic teeth around a periphery of the tone wheel.

20. The automotive assembly of claim 19, wherein the sensor assembly comprises a plurality of magnetic field sensors aligned with the magnetic teeth of the tone wheel.

* * * * *